(12) United States Patent
Geddes

(10) Patent No.: US 9,786,081 B1
(45) Date of Patent: Oct. 10, 2017

(54) TRANSITIONING BETWEEN VISUAL REPRESENTATIONS

(71) Applicant: Domo, Inc., American Fork, UT (US)

(72) Inventor: Jonathan Geddes, Saratoga Springs, UT (US)

(73) Assignee: Domo, Inc., American Fork, UT (US)

( * ) Notice: Subject to any disclaimer, the term of this patent is extended or adjusted under 35 U.S.C. 154(b) by 0 days.

(21) Appl. No.: 14/712,492

(22) Filed: May 14, 2015

(51) Int. Cl.
*G06T 13/00* (2011.01)
*G06Q 10/06* (2012.01)

(52) U.S. Cl.
CPC .......... *G06T 13/00* (2013.01); *G06Q 10/063* (2013.01); *G06T 2213/08* (2013.01)

(58) Field of Classification Search
None
See application file for complete search history.

(56) References Cited

U.S. PATENT DOCUMENTS

2005/0140694 A1* 6/2005 Subramanian .......... G06F 9/545 345/619
2015/0161805 A1* 6/2015 Glazer .................... H04L 67/10 345/441
2016/0104311 A1* 4/2016 Allyn ................. G06F 17/3012 345/473
2016/0267700 A1* 9/2016 Huang ................ G06F 3/04842

\* cited by examiner

*Primary Examiner* — Xiao Wu
*Assistant Examiner* — Mohammad H Akhavannik
(74) *Attorney, Agent, or Firm* — Stoel Rives LLP

(57) ABSTRACT

A transition may be made between first, second, and third visual representations. A first visual representation may be displayed, with a plurality of visual elements arranged in a first arrangement. A processor may generate a first animation in which the visual elements move from the first arrangement toward an intermediate arrangement, and then to a second arrangement corresponding to a second visual representation. The first animation and the second visual representation may be displayed. The processor may generate a second animation in which the visual elements move from the second arrangement toward the intermediate arrangement, and then to a third arrangement corresponding to a third visual representation. The second animation and the third visual representation may be displayed. Thus, smooth transitions may be provided between multiple visual representations via animation toward a common intermediate arrangement.

33 Claims, 8 Drawing Sheets

TRANSITIONING BETWEEN VISUAL REPRESENTATIONS

TECHNICAL FIELD

The present document relates to systems and methods for creating transitions between visual representations. In particular, the present document relates to systems and methods for creating transitions between data visualizations in business intelligence software.

DESCRIPTION OF THE RELATED ART

In the context of data representation, many data visualizations, such as charts and graphs, are used to represent data in a manner that makes the data more meaningful and easier to comprehend for humans. Data visualizations may be used in many different fields, but in particular, are frequently used to monitor the operations of an enterprise. Thus, many business intelligence software packages are capable of generating data visualizations based on bodies of data.

A wide range of data visualizations are known in the art. The choice of which type of data visualization to use to represent a given body of data may not be intuitive, as the user may have to view multiple data visualizations based on the data to determine which data visualization provides the most helpful portrayal of the data. Accordingly, the user may find it helpful to switch between multiple data visualizations. Unfortunately, existing transitions between data visualizations tend to be disjointed for the user, and/or limited in availability.

Specifically, the general approach to transitioning between data visualizations involves the use of a default transition that is independent of the data visualizations between which the transition is to occur. For example, a fade-out and fade-in sequence may be used. The experience for the user can be rather disjointed, as there is no visual link between one data visualization and the next.

Substantial barriers exist to the creation of explicit transitions between data visualizations. Each time a new data visualization is added to a set of available data visualizations, an explicit transition would need to be created between the new data visualization and each of the existing data visualizations. Thus, as the number of available data visualizations grows, the number of transitions that musts be explicitly created grows quadratically. This is in the complexity class $O(n^2)$ (where n is the number or charts) which is not easily scalable.

Thus, it is challenging to create engaging and/or informative transitions between a significant number of available data visualizations. This problem is not unique to data visualizations, but also exists in the context of creating transitions between other types of visual representations and depictions that are artful, representative of processes or events, and/or otherwise beneficial to display to a user.

SUMMARY

Various embodiments of the present disclosure provide systems and methods for creating smooth transitions between visual representations, such as data visualizations. This may be accomplished without requiring the creation of a unique transition between each unique pair of visual representations.

Each visual representation may include a number of visual elements, which may be positioned in an arrangement in order to define the visual representation. One or more intermediate arrangements may also be defined. Animation between two visual representations may be accomplished by animating motion of the visual elements from the arrangement of the first visual representation toward the intermediate arrangement, and then to the arrangement of the second visual representation. The manner in which the visual elements move between each visual representation and the corresponding intermediate arrangement may be defined, for example, in a motion mapping. For each visual representation, definition of this motion mapping may be carried out in place of definition of motion mappings to each other visual representation. Hence, defining transitions falls in the much more manageable complexity class $O(n)$ rather than falling within the complexity class $O(n^2)$ mentioned previously.

In order to provide smooth transitions, in at least one embodiment, the visual elements may not move fully to the intermediate arrangement, but may instead simply approach it. This may be accomplished through the use of a mathematical function such as a spline. In some examples, a quadratic Bezier spline may be used, and may determine the location of each visual element by applying time-varied weights to the locations of the visual elements in the intermediate arrangement and the arrangement of the new visual representation. In order to facilitate application of such a mathematical function, lead-up times may be provided prior to and/or after application of the mathematical function, in which visual elements are added or removed as needed to provide isomorphism. Thus, animations may easily be created that provide a smooth transition between different visual representations.

Such a system and method may be particularly useful for illustrating transitions between data visualizations such as charts and graphs, although they can also be implemented in any other context where it is desirable to provide a transition from one displayed item to another. Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION OF THE EMBODIMENTS

In at least one embodiment, the system and method described herein facilitate the creation of transitions between different visual representations of a set of visual elements. A motion mapping may be used to define how the visual elements of each of the visual representations may move into (or out of) an intermediate arrangement. A transition between two visual representations may be created by generating an animation in which the visual elements move toward the intermediate arrangement, and then to the new visual representation.

In this application, a "visual representation" is an item or scene that can be displayed on a display screen to represent data, one or more objects, or the like. A "data visualization" is a type of visual representation and is a graphical representation of data, such as a chart, graph, or the like. A "visual element" is a component of a visual representation that can be moved to alter the visual representation, such as a point, a line segment, a two-dimensional object or a three-dimensional object. An "arrangement" of visual elements is a set of relative positions and/or orientations for the visual elements that, together, define a visual representation including the visual elements.

System Architecture

According to various embodiments, the system can be implemented on any electronic device equipped to receive, store, and present information. Such an electronic device may be, for example, a desktop computer, laptop computer, smartphone, tablet computer, or the like.

Although the system is described herein in connection with an implementation in a computer, one skilled in the art will recognize that the techniques described herein can be implemented in other contexts, and indeed in any suitable device capable of displaying visual output. Accordingly, the following description is intended to illustrate various embodiments by way of example, rather than to limit scope.

Figure 1A:
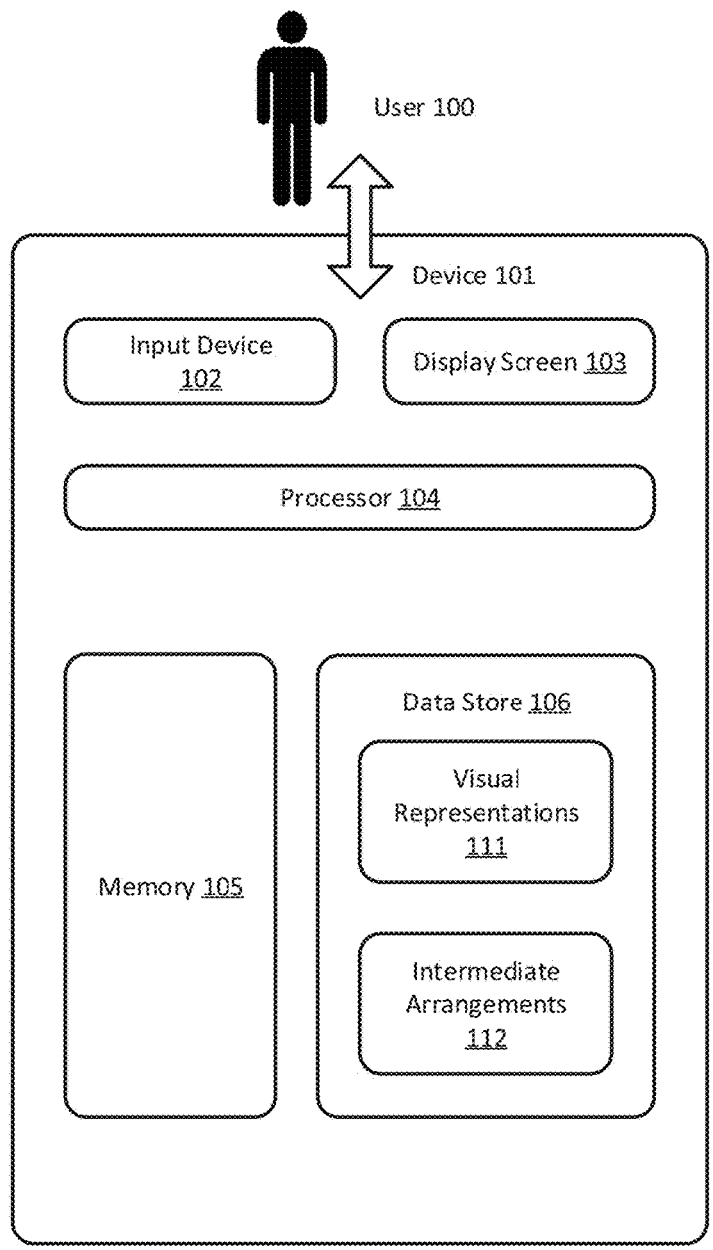
FIG. 1A is a block diagram depicting a hardware architecture according to one embodiment.

Referring now to FIG. 1A, there is shown a block diagram depicting a hardware architecture for practicing the described system, according to one embodiment. Such an architecture can be used, for example, for implementing the techniques of the system in a computer or other device 101. Device 101 may be any electronic device equipped to provide visual output.

In at least one embodiment, device 101 has a number of hardware components well known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech. In at least one embodiment, input device 102 can be omitted.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. The data store 106 may be implemented in a database or using any other suitable arrangement. In another embodiment, data store 106 can be stored elsewhere, and retrieved by device 101 when needed for presentation to user 100. Data store 106 may store one or more data sets, which may be used for a variety of purposes and may include a wide variety of files, metadata, and/or other data. In at least one embodiment, data store 106 may include visual representations 111 and intermediate arrangements 112.

Display screen 103 can be any element that graphically displays information such as items from data store 106 and/or the results of steps performed on such items to provide information useful to a user. Such output may include, for example, raw data, data visualizations, animations, images, photographs, navigational elements, queries requesting confirmation and/or parameters for information identification, display, or presentation, or the like. In at least one embodiment where only some of the desired output is presented at a time, a dynamic control, such as a scrolling mechanism, may be available via input device 102 to change which information is currently displayed, and/or to alter the manner in which the information is displayed.

In at least one embodiment, the information displayed on display screen 103 may include data in text and/or graphical form. Such data may comprise visual cues, such as height, distance, and/or area, to convey the value of each data entry. In at least one embodiment, labels accompany data entries on display screen 103, or can be displayed when user 100 taps on or clicks on a data entry, or causes an onscreen cursor to hover over a data entry.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate means. This communication with other electronic devices is provided as an example and is not necessary.

In at least one embodiment, data store 106 is detachable in the form of a CD-ROM, DVD, flash drive, USB hard drive, or the like. Information can be entered from a source outside of device 101 into a data store 106 that is detachable, and later displayed after the data store 106 is connected to device 101. In another embodiment, data store 106 is fixed within device 101.

Figure 1B:
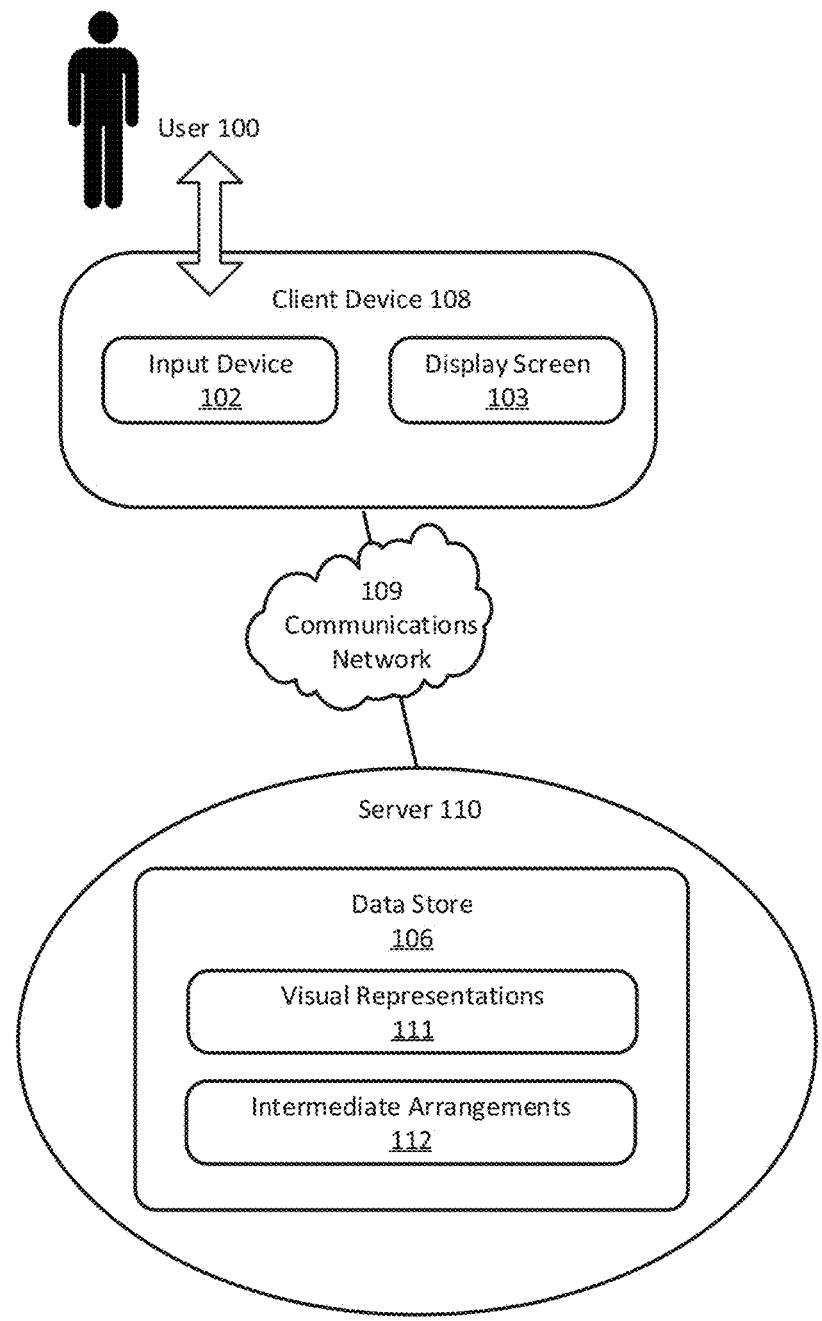
FIG. 1B is a block diagram depicting a hardware architecture in a client/server environment, according to one embodiment.

Referring now to FIG. 1B, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from data store 106, reports, and/or other data derived from data store 106 can be presented as part of such web pages and/or other web-based resources, using known protocols and languages such as Hypertext Markup Language (HTML), Java, JavaScript, and the like.

Client device 108 can be any electronic device incorporating the input device 102 and/or display screen 103, such as a desktop computer, laptop computer, personal digital assistant (PDA), cellular telephone, smartphone, music player, handheld computer, tablet computer, kiosk, game system, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data.

In this implementation, server 110 is responsible for data storage and processing, and incorporates data store 106. Server 110 may include additional components as needed for retrieving data from data store 106 in response to requests from client device 108.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100. In at least one embodiment, an identifying label is also stored along with each data entry, to be displayed along with each data entry.

In at least one embodiment, data store 106 is organized in a file system. Appropriate indexing can be provided to associate particular documents with particular quantitative data elements, reports, other documents, and/or the like. Data store 106 may include any of a wide variety of data structures known in the information storage arts, such as databases and other suitable data storage structures. As in FIG. 1A, data store 106 may include one or more data sets, which may include visual representations 111, intermediate arrangements 112, and/or other data (not shown).

Display screen 103 can be any element that graphically displays information such as items from data store 106 and/or the results of steps performed on such items to provide information useful to a user. Such output may include, for example, raw data, data visualizations, animations, navigational elements, queries requesting confirmation and/or parameters for information identification, display, or presentation, or the like. In at least one embodiment where only some of the desired output is presented at a time, a dynamic control, such as a scrolling mechanism, may be available via input device 102 to change which information is currently displayed, and/or to alter the manner in which the information is displayed.

In at least one embodiment, the information displayed on display screen 103 may include data in text and/or graphical form. Such data may comprise visual cues, such as height, distance, and/or area, to convey the value of each data entry. In at least one embodiment, labels accompany data entries on display screen 103, or can be displayed when user 100 taps on or clicks on a data entry, or causes an onscreen cursor to hover over a data entry.

Processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software.

In one embodiment, the system can be implemented as software written in any suitable computer programming language, whether in a standalone or client/server architecture. Alternatively, it may be implemented and/or embedded in hardware.

Data Structures

In general, the data stored within data store 106 of FIG. 1A or FIG. 1B may include one or more pieces of data, each of which may be of any desired length and format. Thus, each piece of data may be a character string, integer, floating point number, or any other type of data, and may thus represent any information such as names, times, dates, currency amounts, percentages, fractions, physical dimensions, or any other data that may desirably be stored in a computer. As mentioned previously, data store 106 may include visual representations 111, intermediate arrangements 112, and/or other data (not shown).

Figures 2A, 2B:
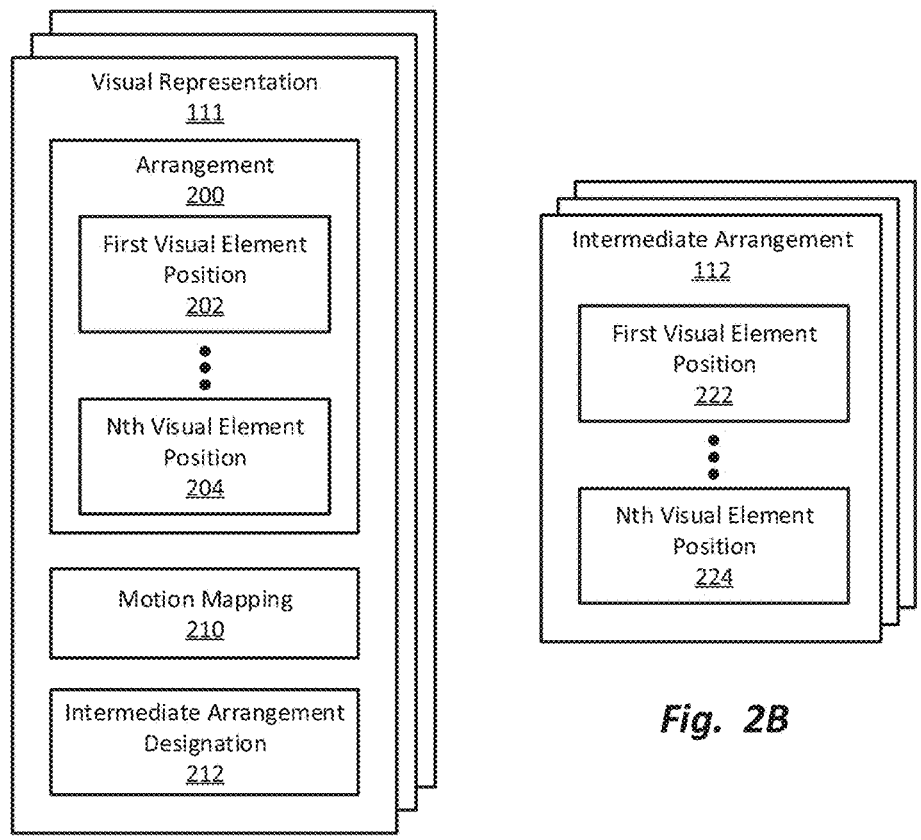
FIGS. 2A and 2B are block diagrams depicting the visual representations and intermediate arrangements of FIGS. 1A and 1B.

Referring to FIG. 2A, a block diagram depicts one of the visual representations 111 of FIGS. 1A and 1B, which is shown by way of example according to one embodiment. As shown, each of the visual representations 111 may have an arrangement 200, a motion mapping 210, and an intermediate arrangement designation 212. The arrangement 200 may specify the manner in which the visual elements are to be arranged to produce the visual representation 111. The motion mapping 210 may specify the manner in which the visual elements are to move in order to reach the intermediate arrangement 112 that pertains to it, which may be designated by the intermediate arrangement designation 212.

In some embodiments, all of the visual representations 111 may transition to one intermediate arrangement 112. Thus, in such embodiments, there may be only one intermediate arrangement 112 in data store 106. In alternative embodiments, there may be more than one of the intermediate arrangements 112, and each of the visual representations 111 may be designed to transition to one of the intermediate arrangements 112.

If desired, in yet other alternative embodiments, one or more of the visual representations 111 may even be designed to be transitioned to more than one of the intermediate arrangements 112. For example, in the context of visual representations 111 in the form of data visualizations, transitioning from a first data visualization ("Chart A") to a second data visualization ("Chart B") may be smoothest and/or most aesthetic if done via a first intermediate arrangement 112. However, transitioning from Chart B to a third data visualization ("Chart C") may be smoothest and/or most aesthetic if done via a second intermediate arrangement 112. Thus, in order to provide smooth and/or aesthetic transitions between Chart B and Charts A and C, Chart B may beneficially be mapped to two intermediate arrangements 112: the first intermediate arrangement 112 and the second intermediate arrangement 112.

As shown, the arrangement 200 of each visual representation 111 may have a first visual element position 202 and optionally, one or more additional visual element positions, up to an nth visual element position 204, each of which provides the position of one of the visual elements that make up the visual representation 111. Thus, for example, each of the first visual element position 202 through the nth visual element position 204 may indicate the coordinates, in two-dimensional or three-dimensional space, of a point, line segment, facet, or other feature of the visual representation 111.

Referring to FIG. 2B, a block diagram depicts one of the intermediate arrangements 112 of FIGS. 1A and 1B, which is shown by way of example according to one embodiment. As shown, the intermediate arrangement 112 may have a first visual element position 222 and optionally, one or more additional visual element positions, up to an nth visual element position 224, each of which provides the position of one of the visual elements that make up the intermediate arrangement 112. Thus, for example, each of the first visual element position 222 through the nth visual element position 224 may indicate the coordinates, in two-dimensional or three-dimensional space, of a point, line segment, facet, vector, or other feature of the intermediate arrangement 112. As another example, each of the first visual element position 222 through the nth visual element position 224 may include relative positions between visual elements, regions in which visual elements may exist, and/or other positional data that does not necessarily provide a precise location relative to a common datum or origin.

Referring jointly to FIGS. 2A and 2B, a visual representation 111 may not be a specific, fully-defined data structure, but may instead be a category. For example, where the visual representations 111 are data visualizations such as charts and graphs, each of the visual representations 111 may be a specific type of chart or graph, including but not limited two-dimensional and three-dimensional charts and graphs of the following types:

Column charts;
Bar charts;
Stock charts;
Surface charts;
Radar charts;
Line charts;
Area charts;
Pie charts;
Doughnut charts;
Scatter charts;
Bubble charts; and
Pivot charts.

Each chart type will have an appearance dependent upon the data it represents. For example, a bar chart will have a number of bars that depends on the number of entries, and each bar will have a length dependent upon the size of the corresponding entry.

Thus, a visual representation 111 corresponding to a bar chart may not necessarily specify the number and/or length of the bars, but rather may provide general rules that can be used to position the bars relative to each other. Consequently, the first visual element position 202 and/or the nth visual element position 204 may not necessarily be specific coordinates in two-dimensional or three-dimensional space, but rather may specify guidelines regarding relative positioning that can be used for a variable number of visual elements. Similarly, the intermediate arrangement 112 may be defined with some flexibility to account for variation in the number of visual elements that may be present.

Given the variability that may be present among visual representations that pertain to one visual representation 111 within data store 106, the process of generating a transition between a visual representation 111 and an intermediate arrangement 112 may be customized to match the details of the visual representation 111 and the intermediate arrangement 112. Thus, the motion mapping 210 for a visual representation 111 may not necessarily specify exact motion paths to be followed by each visual element in order to move from the arrangement 200 to the intermediate arrangement 112. Rather, the motion mapping 210 may provide guidance that can be used to generate such exact motion paths, such as one or more mathematical functions to be applied to obtain the motion paths, parameters to be used for the application of such mathematical functions, and/or the like.

As an alternative, a motion mapping 210 may be global (i.e., applicable to all of the visual representations 111). In such a case, the same mathematical function, parameters, etc. may be used to generate transitions between each of the visual representations 111 and the intermediate arrangement 112 designated by the intermediate arrangement designation 212 for that visual representation 111. Additionally or alternatively, if all of the visual representations 111 are to transition to only one intermediate arrangement 112, the intermediate arrangement designation 212 may also be global, or may be omitted entirely, as there may be no need to specify which intermediate arrangement 112 each of the visual representations 111 is to be transitioned to.

FIGS. 2A and 2B are merely exemplary. Those of skill in the art will recognize that visual representations, intermediate arrangements, and other data structures referenced in the present disclosure may include various data different from or in addition to that illustrated in FIGS. 2A and 2B.

Transition Creation

Transitions between visual representations 111 may be created in a variety of ways. According to some embodiments, such transitions may be provided by enterprise management software that performs multiple functions. For example, such software may facilitate communications among employees of an enterprise, performance tracking through the use of key performance indicators or other tools, display of data visualizations indicative of performance of the enterprise, and/or the like. Thus, creation and display of transitions may be carried out in conjunction with other activities that can be performed on the software platform. Alternatively, transitions may be created for other types of visual representations 111 besides data visualizations, and may be created through the use of more specialized software. In either case, the methods set forth herein may be performed with the aid of a computing system, such as the device 101 of FIG. 1A and/or the client device 108 and/or server 110 of FIG. 1B.

Figure 3:
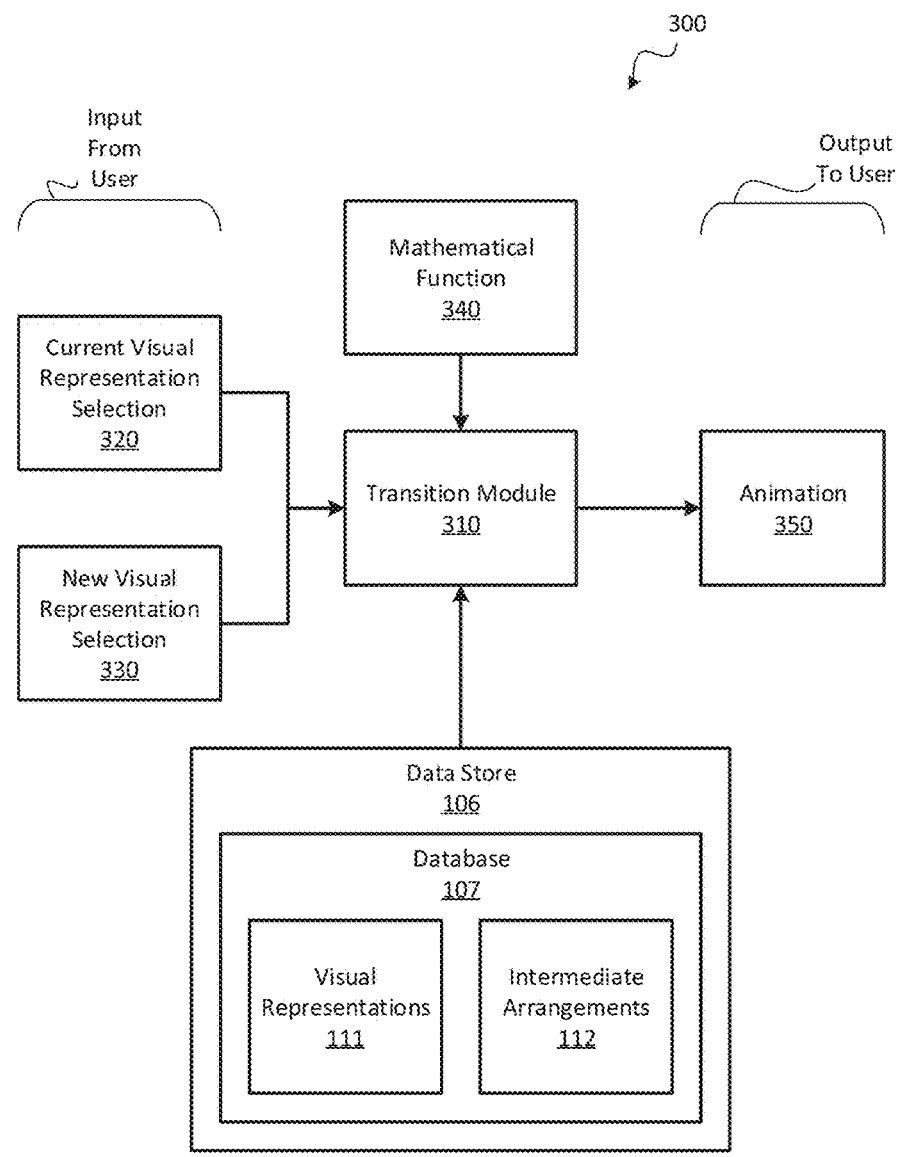
FIG. 3 is a block diagram depicting a system for generating transitions between visual representations, according to one embodiment.

Referring to FIG. 3, a block diagram illustrates a system 300 according to one embodiment. The system 300 may be designed to create transitions between visual representations 111, such as data visualizations, based on the use of one or more of the intermediate arrangements 112. The use of one or more of the intermediate arrangements 112 may provide smooth transitions that do not require the creation of a new motion mapping between each visual representation 111 and each of the other visual representations 111. As indicated previously, transition creation may be carried out in a system that performs other functions pertinent to the management of an enterprise. However, only the architecture pertinent to creation of transitions is shown in FIG. 3.

As shown, the system 300 may have a transition module 310. The transition module may create transitions between any two visual representations 111. More specifically, the user may provide a current visual representation selection 320, for example via the input device 102. The current visual representation selection 320 may designate a specific one of the visual representations 111, which may be viewed by the user 100, for example, on the display screen 103. The user 100 may also provide a new visual representation selection 330, which may designate a specific one of the visual representations 111 that the user 100 wishes to view, in place of that designated by the current visual representation selection 320. The current visual representation selection 320 and the new visual representation selection 330 may both be received via text entry, menu selection, manipulation of a data visualization, or through other methods.

In the alternative to user designation, the current visual representation selection 320 and/or the new visual representation selection 330 may be received in other ways, such as randomly, via a predetermined order (as in a slide show), or the like. In some embodiments, the system 300 may display each available visual representation 111 in sequence, with transitions between each adjacent set of visual representations 111. Such a view may help the user 100 to determine, by viewing several of the visual representations 111, which is optimal for illustrating the underlying data. In other alternatives, one or more artificial intelligence techniques may be used to automatically select the current visual representation selection 320 and/or the new visual representation selection 330 based on characteristics of the underlying data, prior behavior of the user 100, and/or other factors.

The transition module 310 may apply a mathematical function 340 to the visual representation 111 designated by the current visual representation selection 320 to create an animation 350. The animation 350 may provide a transition from the visual representation 111 designated by the current visual representation selection 320 to the visual representation 111 designated by the new visual representation selection 330. The animation 350 may provide a relatively smooth transition between the visual representation 111 designated by the current visual representation selection 320 to the visual representation 111 designated by the new visual representation selection 330.

The animation 350 may include a first part, in which displayed visual elements move from the arrangement 200 of the visual representation 111 of the current visual representation selection 320 toward the intermediate arrangement 112, and a second part in which the displayed visual elements move to the arrangement 200 of the visual representation 111 of the new visual representation selection 330. The mathematical function 340 may guide both of these animation parts, as will be described subsequently. If desired, the motion mapping 210 of the visual representation 111 of the current visual representation selection 320 may be used to guide application of the mathematical function 340 to generate the first portion of the animation 350. Similarly, the motion mapping 210 of the visual representation 111 of the new visual representation selection 330 may be used to guide application of the mathematical function 340 to generate the second portion of the animation 350.

Figure 4:
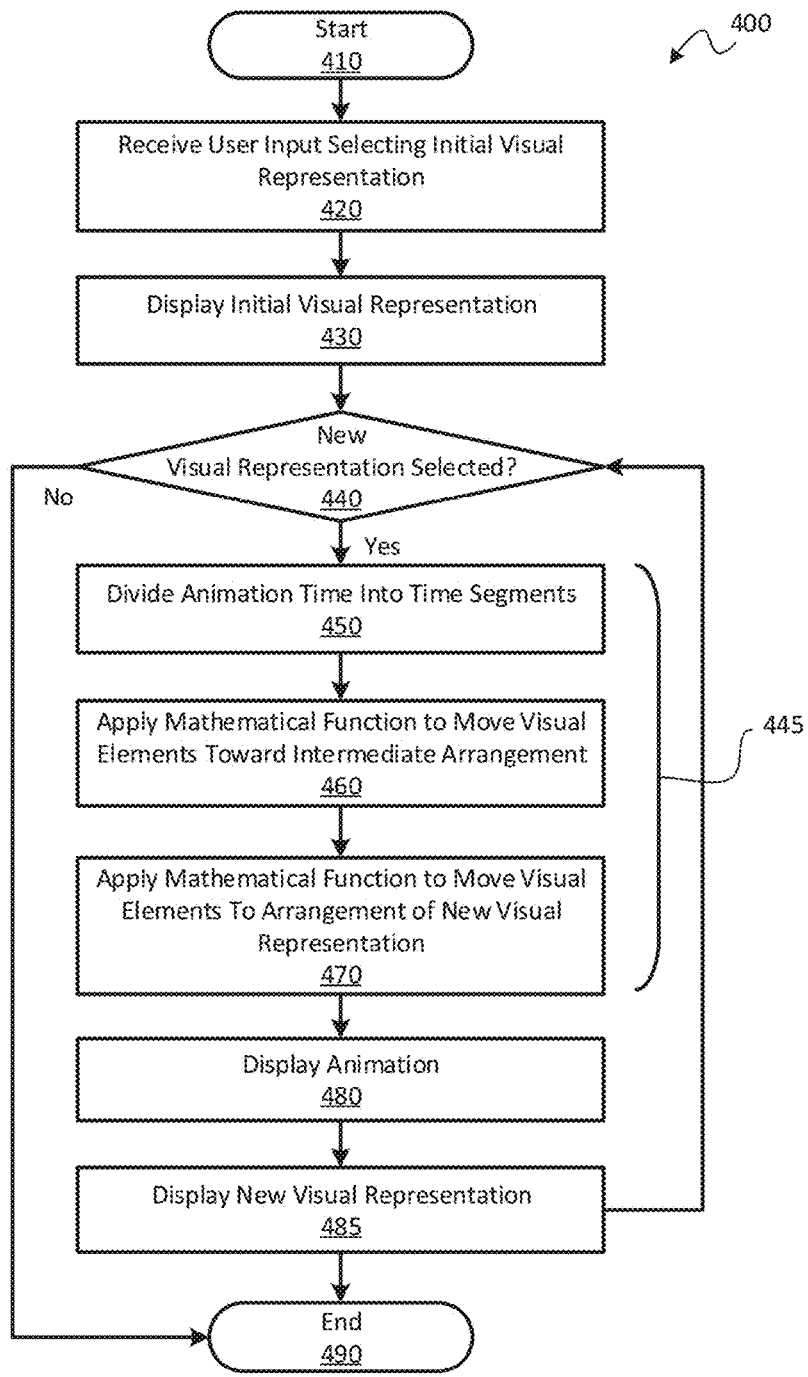
FIG. 4 is a flowchart depicting a method of generating transitions between visual representations, according to one embodiment.

Referring to FIG. 4, a flowchart diagram illustrates a method 400 of creating a transition according to one embodiment. The method 400 may be carried out through the use of a system such as the system 300 of FIG. 3, as will be described by way of example below. Additionally or alternatively, other systems may be used to carry out the method 400. Further, a system such as the system 300 of FIG. 3 may be used to carry out other methods besides the method 400 of FIG. 4.

As shown, the method 400 may start 410 with a step 420 in which the system 300 receives, from the user 100, the current visual representation selection 320, which designates the visual representation 111 that will initially be used. As mentioned previously, in the alternative to the step 420, the current visual representation selection 320 may not be received from the user 100, but may instead be predetermined, randomly assigned, determined according to artificial intelligence, and/or the like. In a step 430, the visual representation 111 designated by the current visual representation selection 320 may be displayed, for example, on the display screen 103 of the device 101 and/or the client device 108.

In a query 440, a determination may be made as to whether the user 100 wishes to designate a new visual representation 111 to be displayed in place of that of the current visual representation selection 320. This determination may be made, for example, by determining whether the user 100 has provided a new visual representation selection 330. If the user 100 does not provide a new visual representation selection 330, the method 400 may end 490, and the visual representation 111 of the current visual representation selection 320 may continue to be displayed.

Like the step 420, the query 440 may, in some embodiments, be satisfied by automated actions rather than user input. For example, the new visual representation selection 330 may not be received from the user 100, but may instead be predetermined, randomly assigned, determined according to artificial intelligence, and/or the like. Additionally or alternatively, satisfaction of the query 440 may be accomplished via other events besides the explicit provision of a new visual representation selection 330; for example, the new visual representation selection 330 may be automatically selected after the visual representation 111 of the current visual representation selection 320 has been displayed for a predetermined period of time, or the like.

Conversely, if the user 100 provides a new visual representation selection 330, the query 440 may be answered in the affirmative. In such an event, the method 400 may proceed to a series 445 of steps in which a transition may be created to provide a smooth visual link between the visual representation 111 of the current visual representation selection 320, and the visual representation 111 of the new visual representation selection 330.

More particularly, the series 445 may commence with a step 450 in which the animation 350 to be created is divided into time segments. This may be done, for example, based on the total length of time to be occupied by the animation 350, and the rate at which animation steps can be displayed to the user 100. For example, if the animation 350 is to last for four seconds, and the animation 350 can be displayed on the display screen 103 at a rate of thirty frames per second, the step 450 may result in the division of the animation 350 into one-hundred and twenty time segments of equal duration.

If desired, the time segments defined in the step 450 may be evenly divided between the two portions of the animation 350 mentioned previously. For example, returning to the example provided above, the first sixty time segments may be used to move the visual elements from the arrangement 200 of the visual representation 111 of the current visual representation selection 320, toward the intermediate arrangement 112. The last sixty segments may then be used to move the visual elements to the arrangement 200 of the visual representation 111 designated by the new visual representation selection 330. These two stages may be accomplished by a step 460 and a step 470, respectively.

In a step 460, the series 445 may provide a transition between the visual representation 111 of the current visual representation selection 320, and the intermediate arrangement 112 pertaining to the visual representation 111 of the current visual representation selection 320. The series 445 of steps need not position the visual elements at the intermediate arrangement 112; rather, as will be discussed subsequently, the visual elements may only be moved toward the intermediate arrangement 112 in order to provide a smoother transition.

The step 460 may be carried out by applying the mathematical function 340 to the visual elements of the visual representation 111 of the current visual representation selection 320, thus moving the visual elements toward the intermediate arrangement 112. This may be done for each time segment defined by the step 450 that is to be used for the first portion of the animation 350, such as the first sixty time segments referenced above. As indicated previously, guidance regarding the mathematical function 340, related parameters, and/or other aspects of its application to the step 460 may optionally be provided by the motion mapping 210 of the visual representation 111 of the current visual representation selection 320.

This intermediate arrangement 112 may advantageously be that pertaining to the visual representation 111 of the new visual representation selection 330. Thus, the series 445 may proceed to a step 470 in which a transition is provided between this intermediate arrangement 112 (or the arrangement of the visual elements provided by the step 460, which may approach, but not be the same as, the intermediate arrangement 112) and the visual representation 111 pertaining to the new visual representation selection 330.

The step 470 may be carried out by applying the mathematical function 340 to the visual elements, thus moving the visual elements toward the arrangement 200 of the visual representation 111 designated by the new visual representation selection 330. This may be done for each time segment defined by the step 450 that is to be used for the second portion of the animation 350, such as the last sixty time segments referenced above. Again, guidance regarding the mathematical function 340, related parameters, and/or other aspects of its application to the step 470 may optionally be provided by the motion mapping 210 of the visual representation 111 of the current visual representation selection 320.

After completion of the step 470, the series 445 of steps may be complete, and the animation 350 may be fully-defined. In a step 480, the animation 350 may be displayed, for example, on the display screen 103. Then, in a step 485, the visual representation 111 designated by the user 100 in the new visual representation selection 330 may be displayed, for example, on the display screen 103. If desired, the step 480 may be followed immediately by the step 485 so that a seamless transition is provided between the end of the animation 350 and the display of the visual representation 111 selected by the user 100.

Similarly, the series 445 of steps may advantageously be carried out in real-time (i.e., with little or no delay that is perceptible to the user 100), so that display of the animation 350 commences directly after the user 100 provides the new visual representation selection 330. The mathematical function 340 may advantageously be selected such that it is not too computationally intensive to be carried out in real-time.

Notably, the first portion of the animation 350 may be displayed in the step 480 while the remainder of the animation 350 is still being generated in the series 445 of steps.

After performance of the step 485, the method 400 may return to the query 440. Thus, the step 450, the step 460, the step 470, the step 480, and the step 485 may be repeated until the user 100 does not wish to provide a new visual representation selection 330. Thus, the user 100 may move between several visual representations 111. If the visual representations 111 are data visualizations, this real-time response may help the user 100 to easily see and track how the underlying data are represented by data visualization. This will be shown and described in connection with FIGS. 5A-5D, as follows.

Figure 5A:
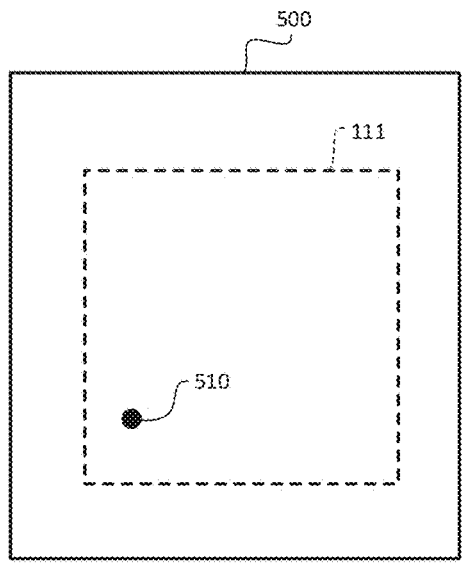
FIGS. 5A through 5D are screenshots illustrating display of a first visual representation, an intermediate representation, a second visual representation, and a portion of an animation that provides a transition between the first visual representation and the second visual representation via the intermediate arrangement, according to one embodiment.

Referring to FIG. 5A, a screenshot 500 illustrates display of a first visual representation 111, according to one embodiment. The first visual representation 111 is illustrated in phantom, indicating that some visual elements are hidden. Only a first visual element is shown; the first visual element may take the form of a point. The first visual element may cooperate with other visual elements (not shown) to define two-dimensional and/or three-dimensional visible features such as line segments, facets, blocks, and/or other surfaces (not shown). In the first visual representation 111, the first visual element is in an arrangement 200 in which it is at a position 510, as shown in FIG. 5A.

Figure 5B:
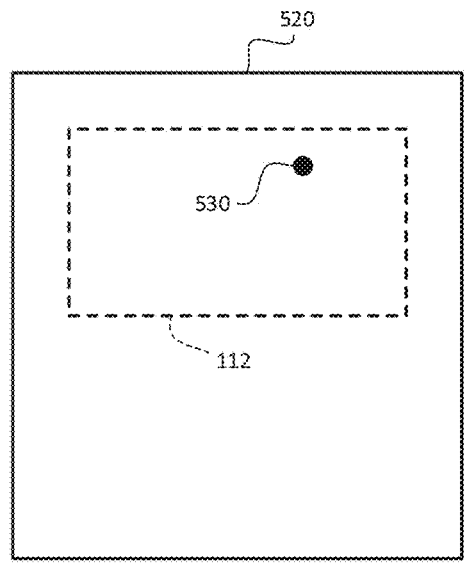

Referring to FIG. 5B, a screenshot 520 illustrates display of an intermediate arrangement 112, according to one embodiment. The intermediate arrangement 112 is illustrated in phantom, indicating that some visual elements are hidden. Only the first visual element is shown. In the intermediate arrangement 112, the first visual element is at a position 530, as shown in FIG. 5B.

Figure 5C:
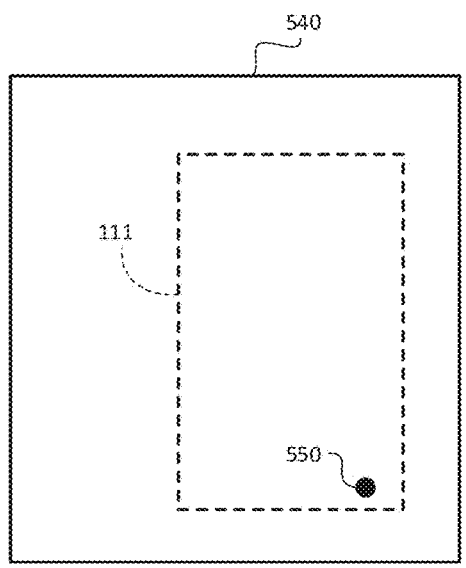

Referring to FIG. 5C, a screenshot 540 illustrates display of a second visual representation 111, according to one embodiment. The second visual representation 111 is illustrated in phantom, indicating that some visual elements are hidden. Only the first visual element is shown. In the second visual representation 111, the first visual element is in an arrangement 200 in which it is at a position 550, as shown in FIG. 5C. The first visual representation 111, the intermediate arrangement 112, and the second visual representation 111 are shaped and positioned differently from each other in FIGS. 5A, 5B, and 5C to indicate that the various visual elements may be arranged differently to present distinct views to the user, such as distinct charts, graphs, aesthetic renditions, and/or the like.

Figure 5D:
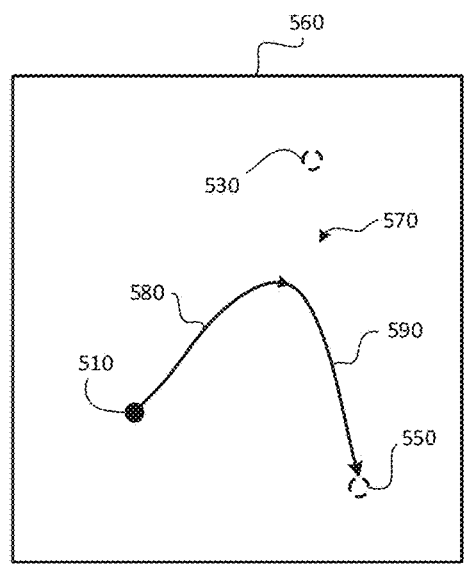

Referring to FIG. 5D, a screenshot 560 illustrates display of a portion of an animation 350 that provides a transition between the first visual representation 111 and the second visual representation 111, via the intermediate arrangement 112. The animation 350 may include a motion path 570 by which the first visual element moves from the position 510 of the first visual representation 111 to the position 550 of the second visual representation 111.

The motion path 570 may include a first portion 580 corresponding to the step 460 of the method 400, and a second portion 590 corresponding to the step 470 of the method 400. Thus, in the first portion 580 of the motion path 570, the first visual element may move from the position 510 toward the position 530. In the second portion 590 of the motion path 570, the first visual element may move from the endpoint of the first portion 580 to the position 550.

Notably, the motion path 570 may not necessarily include motion of the first visual element to the position 530 from the intermediate arrangement 112 shown in FIG. 5B. Such a motion path may not provide for smooth motion of the first visual element; rather, motion of the first visual element may have a discontinuity where it reaches the position 530 and then commences motion toward the position 550. Such a discontinuity may be mitigated by causing the first visual element to decelerate as it approaches the position 530, and then accelerate as it departs the position 530.

However, the overall effect of the animation 350 may be smoother if the first visual element does not reach the position 530 at all, as in FIG. 5D. This may be accomplished in a variety of ways, some of which will be shown and described in connection with the examples of FIGS. 5A, 5B, and 6, as follows.

Examples

Figure 6A:
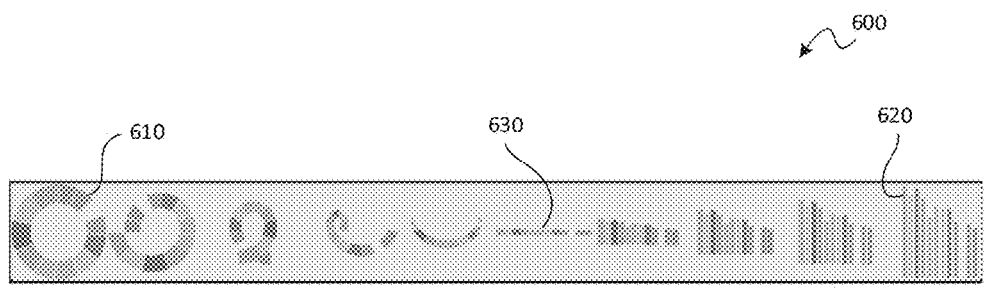
FIG. 6A is a series of screenshots depicting various frames of an exemplary animation from an initial visual representation to an intermediate visual representation, and from the intermediate visual representation to a new visual representation, according to one embodiment.

Referring to FIG. 6A, a series of screenshots 600 depict various frames of an exemplary animation from an initial visual representation to an intermediate visual representation, and from the intermediate visual representation to a new visual representation, according to one embodiment. The screenshots 600 are directed to the example of data visualizations; thus, the screenshots 600 illustrate frames of an animation from an initial data visualization 610 to a new data visualization 620. As shown, in the example of FIG. 5A, the initial data visualization 610 may be a two-dimensional doughnut chart, and the new data visualization 620 may be a two-dimensional column chart.

As shown, the series of screenshots 600 illustrate a transition from the initial data visualization 610 to an intermediate arrangement 630 in the form of a horizontal bar, with a number of colored blocks of equal size. The series of screenshots 600 also illustrates a transition from the intermediate arrangement 630 to the new data visualization 620. The animation presented in the series of screenshots 600 may help the user 100 to easily visualize how the colored sectors of the initial data visualization 610 correspond to the columns of the new data visualization 620.

Display of the intermediate arrangement 630 may detract from the smoothness of the experience because the intermediate arrangement 630 appears to be a data visualization that provides no useful data. Similarly, display of the intermediate arrangement 630 may multiply the number of visual transformations that are taking place by providing an unnecessary intermediate point in the animation between the initial data visualization 610 and the new data visualization 620. Accordingly, in some embodiments it may be advantageous to avoid displaying the intermediate arrangement 630. Thus, in the animation 350, the visual elements of the initial data visualization 610 may be moved, not all the way to the intermediate arrangement 630, but to locations approaching the intermediate arrangement 630 to provide a smoother transition for the user 100.

Figure 6B:
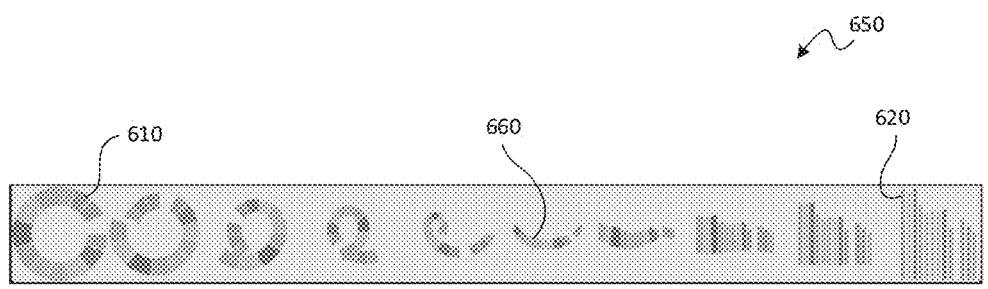
FIG. 6B is a series of screenshots depicting various frames of an exemplary animation from an initial visual representation to a state approaching an intermediate arrangement, and from the state approaching the intermediate arrangement to a new visual representation, according to one embodiment.

Referring to FIG. 6B, a series of screenshots 650 depict various frames of an exemplary animation from an initial visual representation to a state approaching an intermediate arrangement, and from the state approaching the intermediate arrangement to a new visual representation, according to one embodiment. As in FIG. 6A, the screenshots 650 are directed to the example of data visualizations, illustrating transition from the initial data visualization 610 (doughnut chart) of FIG. 6A to the new data visualization 620 (column chart) of FIG. 6A.

In place of the intermediate arrangement 630, the series of screenshots 650 includes a state 660 approaching the intermediate arrangement 630. Notably, the state 660 has an appearance between that of the initial data visualization 610 and that of the new data visualization 620, but different from that of the intermediate arrangement 630. The state 660 is unlikely to be taken as a data visualization by the user 100, and does not represent a distinct intermediate step in the flow of the animation 350 from the initial data visualization 610 to the new data visualization 620. Accordingly, it may be desirable to have the animation 350 move the visual elements toward, but not entirely to, the intermediate arrangement 630. This may be accomplished through the use of a mathematical function, as will be shown and described with reference to FIG. 7.

Figure 7:
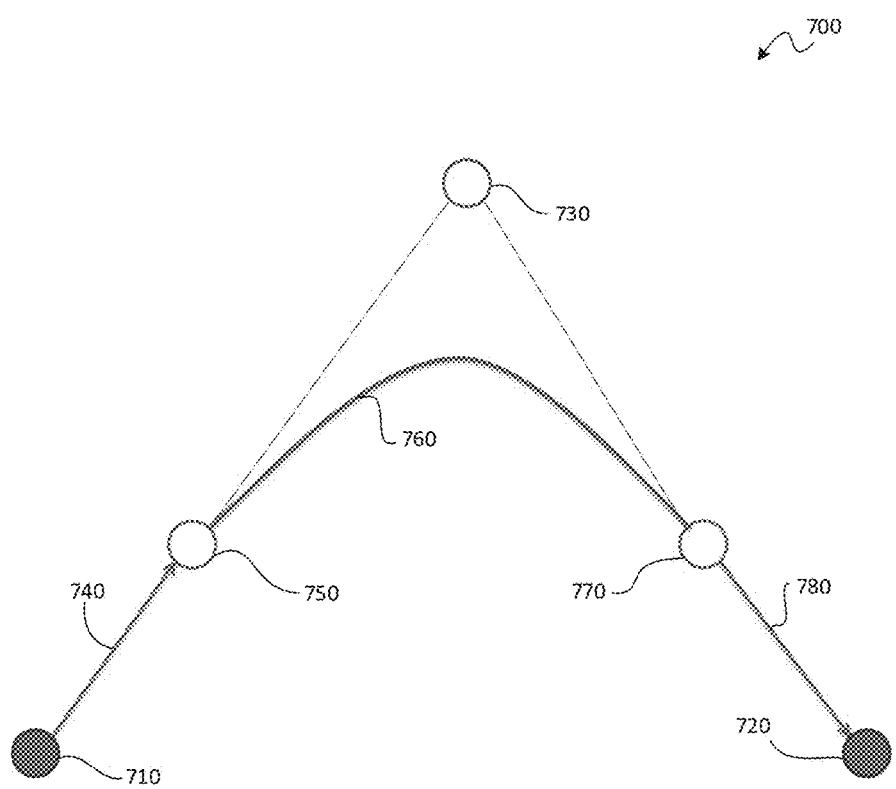
FIG. 7 is a logical diagram illustrating the use of lead-up times and a mathematical function to create an animation from an initial visual representation to a new visual representation, by approaching an intermediate arrangement of visual elements.

Referring to FIG. 7, a logical diagram 700 illustrates the use of lead-up times and a mathematical function 340 to create an animation from an initial visual representation 710 to a new visual representation 720 by approaching, an intermediate arrangement 730 of visual elements. The logical diagram 700 may be followed by the system 300 of FIG. 3 and/or the method 400 of FIG. 4. Further, the logical diagram 700 may represent the manner in which the series of screenshots 650 of FIG. 6B are generated, moving the visual elements of the initial data visualization 610 toward, but not to, the intermediate arrangement 630 of FIG. 6A.

In some embodiments, the mathematical function 340 may be a spline, such as a B-spline. In some embodiments, the mathematical function 340 may be a quadratic Bezier spline. The mathematical function 340 may, for example, be defined by the following formula:

$$P_i = (t-1)*((t-1)*C_{1i} + t*I_i) + t*((t-1)=I+C_{2i})$$

Pursuant to this mathematical function, the position of each point $P_i$ in the animation 350 may come from a blend of the corresponding point $C_{1i}$ in the initial visual representation 710, the corresponding point $C_{2i}$ in the new visual representation 720, and the corresponding point $I_i$ in the intermediate arrangement 730. In this mathematical function, t may represent the current time interval; thus, this mathematical function may be carried out during each time interval, for each of the points $C_{1i}$ (i.e., each of the visual elements). In other embodiments, other visual elements besides points may be used; the same or a similar mathematical function may then be applied to such visual elements.

In some embodiments, an inequality may exist between the number of visual elements in the initial visual representation 710 and the number of visual elements in the intermediate arrangement 730. Where the visual elements are points, such an inequality may be referred to as a lack of point-wise isomorphism. The mathematical function 340 may function optimally where point-wise isomorphism exists. Thus, before the mathematical function 340 is applied, it may be beneficial to provide such point-wise isomorphism, for example, by removing visual elements from the initial visual representation 710 or adding visual elements to those of the initial visual representation 710.

This is illustrated in FIG. 7 by the presence of a first lead-up time 740 that moves from the initial visual representation 710 to a first isomorphic state 750. If the visual elements added to or taken from the initial visual representation 710 result in a visual change to the initial visual representation 710, the first lead-up time 740 may be part of the animation 350 so as to avoid having any sudden changes in the animation 350 that may otherwise confuse the user 100 or lead to a disjointed experience. Conversely, it may be desirable to add points and/or remove them in a manner that substantially avoids changing the appearance of the initial visual representation 710. In such an event, the first lead-up time 740 need not be included in the animation 350.

Returning to the example of data visualizations, the first lead-up time 740 may include adding or removing one or more columns in a column chart. Such a change would likely be visible to the user, and may thus be done in a gradual manner as part of the animation 350. Alternatively, additional points may be added to or taken from the columns in a column chart without significantly changing the appearance of the column chart. Such a change may not be visible to the user 100, and may therefore be excluded from the animation 350, but carried out prior to application of the mathematical function 340. If included in the animation 350, the first lead-up time 740 may advantageously provide isomorphism between visual elements in a gradual and/or continuous manner so as to ensure that the animation 350, as a whole, remains smooth.

At the animation 350, the initial visual representation 710 may have been modified to have the same number of visual elements as the intermediate arrangement 730. Thus, if the visual elements are points, point-wise isomorphism may exist between the first isomorphic state 750 and the intermediate arrangement 730. Thus, the mathematical function 340 may be applied, resulting in a curve 760. The curve 760 represents the gradual transition followed by the animation 350, from the first isomorphic state 750 toward the intermediate arrangement 730, and then to a second isomorphic state 770.

Notably, the curve 760 approaches the intermediate arrangement 730, but does not arrive at or pass through the intermediate arrangement 730. This represents an embodiment as in FIG. 6B, in which the state 660 approaching the intermediate arrangement 630 is displayed as part of the animation 350, without actually displaying the intermediate arrangement 630.

The second isomorphic state 770 may have the same number of visual elements as the first isomorphic state 750 and the intermediate arrangement 730. Thus, if the visual elements are points, point-wise isomorphism may exist between the intermediate arrangement 730, the first isomorphic state 750, and the second isomorphic state 770. However, this may not necessarily be equal to the number of visual elements (or points, if applicable) in the new visual representation 720. Thus, a second lead-up time 780 may exist, in which visual elements are added to or taken from the second isomorphic state 770 to provide the number of visual elements present in the new visual representation 720.

As in the case of the first lead-up time 740, the second lead-up time 780 may or may not result in a user-perceptible change to the second isomorphic state 770. If a user-perceptible change is made, the second lead-up time 780 may be carried out gradually, and may be included in the animation 350 so as to avoid providing a disjointed user experience. Conversely, if the change to the second isomorphic state 770 made by the second lead-up time 780 is not user-perceptible, the second lead-up time 780 may not necessarily be included in the animation 350.

Once the second lead-up time 780 is complete, the animation 350 may be complete. Further, the new visual representation 720 may be ready for display for the user 100 (as in the step 485) and/or modification or other manipulation by the user. Thus, the user 100 may be presented with an animation 350 that illustrates the transition from the initial visual representation 710 to the new visual representation 720, regardless of whether point-wise isomorphism exists between the initial visual representation 710, the new visual representation 720, and the intermediate arrangement 730, and without explicitly showing the intermediate arrangement 730 to the user 100.

Thus, transitions between visual representations 111 of a wide variety of types may be defined for on-the-fly creation. This may be done by providing a motion mapping 210 for each visual representation 111, rather than providing a plurality of motion mappings for each visual representation 111 to enable creation of transitions to each other visual representation 111.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A method, comprising:
   at a display screen, displaying a first visual representation comprising a plurality of visual elements arranged in a first arrangement;
   at a processor, generating a first animation to transition from the first arrangement of the first visual representation to a second arrangement of a second visual representation, wherein generating the first animation comprises:
      generating a first part of the first animation by applying a first predetermined mapping between the first arrangement and an intermediate arrangement to the plurality of visual elements such that the plurality of visual elements move from the first arrangement toward the intermediate arrangement during the first part of the first animation and are arranged in a transition arrangement upon completion of the first part of the first animation, and
      generating a second part of the first animation by applying a second predetermined mapping between the second arrangement and the intermediate arrangement to the plurality of visual elements such that the plurality of visual elements move from the intermediate arrangement toward the second arrangement during the second part of the first animation and are arranged in the second arrangement upon completion of the second part of the first animation,
   wherein each of the first arrangement, the second arrangement, the transition arrangement, and the intermediate arrangement correspond to different respective arrangements of the plurality of visual elements;
   at the display screen, displaying the first animation, including the first part and the second part; and
   at the display screen, displaying a second visual representation comprising the plurality of visual elements arranged in the second arrangement.

2. The method of claim 1, further comprising:
   at the processor, generating a second animation in which the visual elements move from the second arrangement toward the intermediate arrangement, and then to a third arrangement different from the first arrangement, the second arrangement, and the intermediate arrangement;
   at the display screen, displaying the second animation; and at the display screen, displaying a third visual representation comprising the plurality of visual elements arranged in the third arrangement.

3. The method of claim 2, wherein the first visual representation comprises a first data visualization that graphically illustrates a data set;
wherein the second visual representation comprises a second data visualization that graphically illustrates the data set;
and wherein the third visual representation comprises a third data visualization that graphically illustrates the data set.

4. The method of claim 3, wherein at least two of the first data visualization, the second data visualization, and the third data visualization are selected from the group consisting of column charts, bar charts, stock charts, surface charts, radar charts, line charts, area charts, pie charts, doughnut charts, scatter charts, bubble charts, and pivot charts.

5. The method of claim 3, wherein each of the visual elements is a point, wherein, in the first animation, the points are connected together by a plurality of line segments that cooperate to define a plurality of planar elements.

6. The method of claim 5, wherein generating the first animation further comprises:
determining that an inequality exists between an intermediate quantity of visual elements in the intermediate arrangement, and a first quantity of visual elements in the first arrangement; and
prior to moving the visual elements to the second arrangement, correcting the inequality.

7. The method of claim 5, wherein generating the second animation further comprises:
determining that an inequality exists between an intermediate quantity of visual elements in the intermediate arrangement, and a second quantity of visual elements in the second arrangement; and
prior to displaying the second visual representation, correcting the inequality.

8. The method of claim 2, wherein generating the first animation comprises moving the visual elements such that the visual elements do not move to the intermediate arrangement.

9. The method of claim 8, wherein generating the first animation comprises:
dividing a first time period to be occupied by the first animation into a plurality of time segments; and
at each time segment of the plurality of time segments, applying a mathematical function that uses a first position of each of the visual elements in the first arrangement, a second position of each of the visual elements in the second arrangement, and an intermediate position of each of the visual elements in the intermediate arrangement to obtain a segment position of each of the visual elements at the time segment.

10. The method of claim 9, wherein the mathematical function comprises a spline.

11. The method of claim 10, wherein the spline comprises a quadratic Bezier spline.

12. The method of claim 11, wherein each of the visual elements comprises a point, and wherein, in the first animation, the points are connected together by a plurality of line segments that cooperate to define a plurality of planar elements.

13. The method of claim 2, further comprising, after displaying the first visual representation:
at an input device, receiving a first user input indicative of a desire to display the second visual representation;

wherein generation of the first animation is carried out in response to receipt of the first user input.

14. The method of claim 13, further comprising, after displaying the second visual representation:
at the input device, receiving a second user input indicative of a desire to display the third visual representation;
wherein generation of the second animation is carried out in response to receipt of the first user input.

15. The method of claim 2, further comprising, after displaying the third visual representation:
at the processor, generating a third animation in which the visual elements move from the third arrangement toward a second intermediate arrangement different from the first arrangement, the second arrangement, the third arrangement, and the intermediate arrangement, and then to a fourth arrangement different from the first arrangement, the second arrangement, the third arrangement, the intermediate arrangement and the second intermediate arrangement;
at the display screen, displaying the third animation; and
at the display screen, displaying a fourth visual representation comprising the plurality of visual elements arranged in the fourth arrangement.

16. A non-transitory computer-readable medium for transitioning between first, second, and third visual representations, comprising instructions stored thereon, that when executed by a processor, perform the steps of:
causing a display screen to display a first visual representation comprising a plurality of visual elements arranged in a first arrangement, the first visual representation defining first mappings between the first arrangement and an intermediate arrangement;
generating a first animation to transition from the first visual representation to a second visual representation, the second visual representation defining second mappings between a second arrangement and the intermediate arrangement, wherein generating the first animation comprises:
producing a first sequence of the first animation in which the visual elements move from the first arrangement toward an intermediate arrangement different from the first arrangement such that the plurality of visual elements are arranged in a transitory arrangement upon completion of the first sequence, and
producing a second sequence of the first animation in which the visual elements move from the transitory arrangement to the second arrangement such that the plurality of visual elements are arranged in the second arrangement upon completion of the second sequence,
wherein the intermediate arrangement differs from each of the first arrangement, the second arrangement, and the transitory arrangement;
causing the display screen to display the first animation, including the first sequence and the second sequence; and
causing the display screen to display a second visual representation comprising the plurality of visual elements arranged in the second arrangement upon completion of the first animation.

17. The non-transitory computer-readable medium of claim 16, further comprising instructions stored thereon, that when executed by a processor, perform the steps of:
generating a second animation in which the visual elements move from the second arrangement toward the intermediate arrangement, and then to a third arrangement different from the first arrangement, the second arrangement, and the intermediate arrangement;

causing the display screen to display the second animation; and causing the display screen to display a third visual representation comprising the plurality of visual elements arranged in the third arrangement.

18. The non-transitory computer-readable medium of claim 17, wherein the first visual representation comprises a first data visualization that graphically illustrates a data set;

wherein the second visual representation comprises a second data visualization that graphically illustrates the data set;

and wherein the third visual representation comprises a third data visualization that graphically illustrates the data set.

19. The non-transitory computer-readable medium of claim 18, wherein each of the visual elements is a point, wherein, in the first animation, the points are connected together by a plurality of line segments that cooperate to define a plurality of planar elements.

20. The non-transitory computer-readable medium of claim 19, wherein generating the first animation comprises:

determining that an inequality exists between an intermediate quantity of visual elements in the intermediate arrangement, and one of a first quantity of visual elements in the first arrangement and a second quantity of visual elements in the second arrangement; and prior to displaying the second visual representation, correcting the inequality.

21. The non-transitory computer-readable medium of claim 17, wherein generating the first animation comprises moving the visual elements such that the visual elements do not move to the intermediate arrangement.

22. The non-transitory computer-readable medium of claim 21, wherein generating the first animation comprises:

dividing a first time period to be occupied by the first animation into a plurality of time segments; and at each time segment of the plurality of time segments, applying a mathematical function that uses a first position of each of the visual elements in the first arrangement, a second position of each of the visual elements in the second arrangement, and an intermediate position of each of the visual elements in the intermediate arrangement to obtain a segment position of each of the visual elements at the time segment.

23. The non-transitory computer-readable medium of claim 22, wherein applying the mathematical function comprises applying a quadratic Bezier spline.

24. The non-transitory computer-readable medium of claim 17, further comprising, after displaying the first visual representation:

at an input device, receiving the first user input indicative of a desire to display the second visual representation; and at the input device, receiving the second user input indicative of a desire to display the third visual representation;

wherein generation of the first animation is carried out in response to receipt of the first user input;

and wherein generation of the second animation is carried out in response to receipt of the first user input.

25. A system for transitioning between first, second, and third visual representations, the system comprising:

a display screen configured to display a first visual representation comprising a plurality of visual elements arranged in a first arrangement;

a processor, communicatively coupled to the display screen, configured to generate a first animation to transition from the first visual representation in which the visual elements are arranged in the first arrangement to a second visual representation in which the visual elements are arranged in a second arrangement different from the first arrangement, wherein generating the first animation comprises:

generating a first portion of the first animation by use of first predetermined mappings between the first arrangement and an intermediate arrangement, such that the visual elements move from the first arrangement towards the intermediate arrangement during the first portion of the first animation and are arranged in a transition arrangement different from each of the first arrangement, the intermediate arrangement, and the second arrangement, upon completion of the first portion of the first animation, and generating a second portion of the animation by use of second predetermined mappings between the second arrangement and the intermediate arrangement, such that the visual elements move from the transition arrangement towards the second arrangement during the second portion of the first animation and are arranged in the second arrangement upon completion of the second portion of the first animation, and wherein the display screen is further configured to:
display the first animation; and
display a second visual representation comprising the plurality of visual elements arranged in the second arrangement.

26. The system of claim 25, wherein the processor is further configured to generate a second animation in which the visual elements move from the second arrangement toward the intermediate arrangement, and then to a third arrangement different from the first arrangement, the second arrangement, and the intermediate arrangement;

and wherein the display screen is further configured to:
display the second animation; and
display a third visual representation comprising the plurality of visual elements arranged in the third arrangement.

27. The system of claim 26, wherein the first visual representation comprises a first data visualization that graphically illustrates a data set;

wherein the second visual representation comprises a second data visualization that graphically illustrates the data set;

and wherein the third visual representation comprises a third data visualization that graphically illustrates the data set.

28. The system of claim 27, wherein each of the visual elements is a point, wherein, in the first animation, the points are connected together by a plurality of line segments that cooperate to define a plurality of planar elements.

29. The system of claim 28, wherein the processor is configured to generate the first animation by:

determining that an inequality exists between an intermediate quantity of visual elements in the intermediate arrangement, and one of a first quantity of visual elements in the first arrangement and a second quantity of visual elements in the second arrangement; and prior to displaying the second visual representation, correcting the inequality.

30. The system of claim 26, wherein the processor is further configured to generate the first animation by moving the visual elements such that the visual elements do not move to the intermediate arrangement.

31. The system of claim 30, wherein the processor is further configured to generate the first animation by:

dividing a first time period to be occupied by the first animation into a plurality of time segments; and at each time segment of the plurality of time segments, applying a mathematical function that uses a first position of each of the visual elements in the first arrangement, a second position of each of the visual elements in the second arrangement, and an intermediate position of each of the visual elements in the intermediate arrangement to obtain a segment position of each of the visual elements at the time segment.

32. The system of claim 31, wherein the processor is further configured to apply the mathematical function by applying a quadratic Bezier spline.

33. The system of claim 26, further comprising:

an input device, communicatively coupled to the processor, configured to:

after display of the first visual representation, receive the first user input indicative of a desire to display the second visual representation; and after display of the second visual representation, receive second user input indicative of a desire to display the third visual representation;

wherein the processor is further configured to:

generate the first animation by generating the first animation in response to receipt of the first user input; and generate the second animation by generating the second animation in response to receipt of the second user input.

* * * * *